US011457409B2

United States Patent
Mazloum et al.

(10) Patent No.: US 11,457,409 B2
(45) Date of Patent: Sep. 27, 2022

(54) PROCEDURE FOR SYNCHRONIZATION SIGNALING IN IDLE MODE DURING DRX OPERATION

(71) Applicant: SONY CORPORATION, Tokyo (JP)

(72) Inventors: Nafiseh Mazloum, Lund (SE); Rickard Ljung, Helsingborg (SE); Basuki Priyanto, Lund (SE); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/041,938

(22) PCT Filed: May 7, 2019

(86) PCT No.: PCT/SE2019/050399
§ 371 (c)(1),
(2) Date: Sep. 25, 2020

(87) PCT Pub. No.: WO2019/216808
PCT Pub. Date: Nov. 14, 2019

(65) Prior Publication Data
US 2021/0037465 A1 Feb. 4, 2021

(30) Foreign Application Priority Data
May 10, 2018 (SE) .................................. 1850552-9

(51) Int. Cl.
*H04W 52/02* (2009.01)
*H04W 76/28* (2018.01)
*H04W 68/00* (2009.01)

(52) U.S. Cl.
CPC ..... *H04W 52/0216* (2013.01); *H04W 68/005* (2013.01); *H04W 76/28* (2018.02)

(58) Field of Classification Search
None
See application file for complete search history.

(56) References Cited

U.S. PATENT DOCUMENTS 5,930,718 A * 7/1999 Rydbeck ............... H04W 68/02
455/430
2002/0123358 A1 * 9/2002 Butler ................... H04L 1/0025
455/458

(Continued)

FOREIGN PATENT DOCUMENTS

CN 109511132 A * 3/2019 ............ H04W 24/10
WO WO-2017052596 A1 * 3/2017 ............... H04B 1/04

(Continued)

OTHER PUBLICATIONS

Swedish Search Report from corresponding Swedish Application No. 1850552-9, dated Dec. 20, 2018, 3 pages.
International Search Report and Written Opinion from corresponding International Application No. PCT/SE2019/050399, dated Jul. 8, 2019, 12 pages.

(Continued)

*Primary Examiner* — Jamaal Henson
(74) *Attorney, Agent, or Firm* — Tucker Ellis LLP

(57) ABSTRACT

A terminal, and a method for operating a terminal in idle mode to detect signaling from an access node of a wireless network, comprising receiving configuration from the access node, identifying paging occasions and wake-up signal occasions associated with a discontinuous reception DRX period, receiving information from the access node, identifying a time advance duration; and activating a wireless signal receiver in the terminal for a period of said time advance duration prior to each paging occasion.

16 Claims, 5 Drawing Sheets

(56) References Cited

U.S. PATENT DOCUMENTS

| | | | | |
|---|---|---|---|---|
| 2003/0114132 | A1* | 6/2003 | Yue | H04W 68/00 455/343.1 |
| 2005/0277429 | A1* | 12/2005 | Laroia | H04W 68/025 455/434 |
| 2011/0150252 | A1* | 6/2011 | Solum | H04W 56/0035 381/314 |
| 2012/0122495 | A1* | 5/2012 | Weng | H04W 68/025 455/458 |
| 2014/0112229 | A1* | 4/2014 | Merlin | H04L 5/0055 370/311 |
| 2014/0198696 | A1* | 7/2014 | Li | H04W 52/0229 370/311 |
| 2019/0254110 | A1* | 8/2019 | He | H04L 41/0896 |

FOREIGN PATENT DOCUMENTS

| | | | | |
|---|---|---|---|---|
| WO | WO-2018202693 A1 | * | 11/2018 | H04W 24/10 |
| WO | WO-2018202751 A1 | * | 11/2018 | H04W 4/70 |
| WO | WO-2019030337 A1 | * | 2/2019 | H04J 13/0022 |
| WO | WO-2019063479 A1 | * | 4/2019 | H04W 76/28 |
| WO | WO-2019063497 A1 | * | 4/2019 | H03F 1/02 |
| WO | WO-2019063819 A1 | * | 4/2019 | H04W 52/0216 |

OTHER PUBLICATIONS

Qualcomm Incorporated, "Efficient monitoring of DL control channels", 3GPP TSG RAN WG1 Meeting #92bis, R1-1804914, Apr. 16-20, 2018, 13 pages.

Qualcomm Incorporated, "Further discussion on Wake-up signal functions", 3GPP TSG RAN WG1 Meeting #91, R1-1720422, Nov. 27-Dec. 1, 2017, 10 pages.

Ericsson, "Wake up Signal in NB-IoT and MTC", 3GPP TSG-RAN2 Meeting #101, R2-1802586, Feb. 26-Mar. 2, 2018, 11 pages.

Ericsson, "Wake-up signal", 3GPP TSG-RAN2 Meeting #101 bis, R2-1804962, Apr. 16-20, 2018, 9 pages.

Sony, "Considerations on WUS for efeMTC"; 3GPP TSG RAN WG1 Meeting #92, R1-2802056, Feb. 26-Mar. 2, 2018, 7 pages.

Samsung, "DL Power consumption reduction for eMTC", 3GPP TSG RAN WG1 Meeting #92bis; R1-1804326, Apr. 16-20, 2018, 7 pages.

Qualcomm Incorporated, "Further discussion on Wake-up signal functions"; 3GPP TSG RAN WG1 Meeting #92bis, R1-1804918, Apr. 16-20, 2018, 7 pages.

Ericsson, "Wake-up signal for NB-IoT & eMTC", 3GPP TSG-RAN WG2 #100; R2-1713033, Nov. 27-Dec. 1, 2017, 9 pages.

Ericsson, "Downlink channel power efficiency for MTC", 3GPP TSG-RAN WG1 #92, R1-1801483, Feb. 26-Mar. 2, 2018, 13 pages.

* cited by examiner

PROCEDURE FOR SYNCHRONIZATION SIGNALING IN IDLE MODE DURING DRX OPERATION

TECHNICAL FIELD

This disclosure relates to methods and devices in a wireless communication system, comprising an access network and one or more wireless terminals. Specifically, solutions are provided which relate to signaling a terminal in idle mode from an access node of the access network, where the terminal is arranged to detect paging occasions under discontinuous reception.

BACKGROUND

In radio communication systems, such as various generations provided through the 3rd Generation Partnership Project (3GPP), various specifications have been provided for setting up common rules for setting up and operating both a wireless radio interface between a wireless terminal and a network node, and various levels of operation of the network. In 3GPP documentation, a terminal is commonly referred to as a User Equipment (UE), but will generally be referred to herein as a terminal. Such terminals are connectable to a core network by means of a radio access network RAN, which includes one or more network nodes, operative to provide radio access to terminals within a cell. Such network nodes may also be referred to as an access node or a base station, and various terms are used in 3GPP for different types of systems or specifications. In the so-called 4G specifications, also referred to as Long-Term Evolution (LTE), the term eNodeB (eNB) is used to denote a network node.

After successful implementation and use of the 4G communication system, efforts to develop an improved 5G communication system or a pre-5G communication system have been conducted. For this reason, the 5G communication system or the pre-5G communication system is called a communication system beyond 4G network, and also New Radio (NR). A network node configured to operate in a 5G radio access network may be denoted a gNB.

With the introduction of technical specifications and frameworks for machine type communication, the number of terminals is expected to grow rapidly over the coming years. 3GPP already introduced two complementary narrowband LTE IoT technologies in Release 13: eMTC (enhanced machine-type communication) and NB-IoT (narrowband Internet of Things). Both are optimized for lower complexity/power, deeper coverage, and higher device density, while seamlessly coexisting with other LTE services such as regular mobile broadband.

Two new signals, i.e., an enhanced synchronization signal (eSS), and a wake-up signal (WUS) have been agreed to be introduced in the on-going 3GPP rel. 15 to MTC with the objective to reduce the total energy cost of UEs. The periodicity of the first subframe of the enhanced synchronization signal may be configurable to 160, 320, 640 and 1280 ms. The enhanced synchronization signal may alternatively be denoted a resynchronization signal (RSS). The WUS is expected to be sent prior to paging indicator in physical data control channel (MPDCCH) and the UE only decodes the control channel and the subsequent data shared channel if it detects the WUS carrying certain information related to it. The eSS utilization is controlled by the network and its usage may be informed to UEs via e.g. cell specific broadcast information. It is not mandatory for the eSS to be activated in a cell, and in such case a UE will need to perform its synchronization by other means e.g. via other reference signals such as the existing primary and secondary synchronization signals (PSS/SSS) and common reference signal (CRS) in LTE. There may also be possibilities to perform synchronization with the network via detection of WUS, depending on the structure and information available in WUS. The WUS can be constructed as an "eSS-like" signal.

It is contemplated that various terminals may be configured with a separate low-power receiver, for detecting a WUS. This way a main wireless receiver need only be activated once a WUS is detected. The objective is to reduce power consumption, since the added receiver would be configured to consume less power than the main receiver. Herein, a terminal where a main wireless receiver used e.g. for detecting control signal or control channel during a paging occasion PO is also used for WUS detection, is referred to as Config. 1, whereas a terminal with a lower power receiver for WUS detection is referred to as Config. 2. Depending on this UE receiver configuration, the decoding of the eSS used for synchronization purposes can be more suitable to be done either prior or after the WUS detection, as shown in FIG. 1. If the main receiver is used for WUS detection, Config. 1, the UE needs to first decode the newly introduced signal eSS to obtain synchronization and to be able to decode/detect the WUS and subsequently the paging indication in paging occasion (PO), if a WUS is detected. This is illustrated in FIG. 1A. If a separate low-power receiver is used for WUS detection, Config. 2, the UE only needs to decode eSS if a WUS is detected, for further detection of a control channel and message exchange in the PO. This is illustrated in FIG. 1B.

Depending on the periodicity of eSS, the duration of eSS and WUS, and the time duration between eSS, WUS and PO, the amount of achievable energy savings at the UE may vary:

Example-1: If the time gap Tgap1 in Config. 1 is large, some parts of UE's circuitry, e.g., channel estimator, needs to stay on to keep the UE and cell synchronized. This consequently leads to extra energy cost. In Config. 2, too short Tgap1_LP and a long eSS (or too small Tgap3_LP), on the other hand, may degrade the function of WUS operation since the UE will not have enough time to wake up after receiving the WUS.

Example-2: For Config. 1, assume that different UEs in the cell follow the same discontinuous reception (DRX) cycles, but have different POs. Configuring the eSS periodicity to one certain value might be beneficial for one UE1, shown in the top part of FIG. 2 while it can lead to extra energy in another UE2. This is shown in the bottom part of FIG. 2, where Tgap3 becomes very long for UE2.

SUMMARY

Consequently, there still exists a need for improvement in the configuration of signaling related to terminals operating under DRX and using a WUS to initiate paging. Therefore, it is proposed that a time relation is considered between PO, eSS, and WUS, so as to achieve as high energy savings as possible when these types of signaling are used. The proposed solutions are set out in the independent claims. Various embodiments are set out in the dependent claims.

According to a first aspect, a method is provided for operating a terminal in idle mode to detect signaling from an access node of a wireless network, comprising receiving configuration from the access node, identifying paging occasions and wake-up signal occasions associated with a discontinuous reception DRX period, receiving information from the access node, identifying a time advance duration; and activating a wireless signal receiver in the terminal for a period of said time advance duration prior to each paging occasion.

In one embodiment, the method comprises detecting a synchronization signal and a wake-up signal in the period of said time advance duration;

detecting a paging message in a paging occasion succeeding said time advance duration.

In one embodiment, the method comprises transmitting terminal capability to the wireless network, indicating whether the terminal includes a separate receiver for WUS detection.

According to a second aspect, a method is provided for signaling a terminal in idle mode from an access node of a wireless network, comprising:

determining repeated paging occasions for the terminal with a discontinuous reception, DRX, period;

determining wake-up signal, WUS, occasions associated with said paging occasions;

transmitting a synchronization signal usable for assisting in detecting the WUS or a control channel in the paging occasion in the terminal, wherein the synchronization signal is repeatedly transmitted with a transmission period which is associated with said DRX period.

In one embodiment, the transmission period is a fraction 1/k of the DRX period, where k is an integer number.

In one embodiment, the method comprises determining a time advance duration preceding paging occasion, dependent on a determined required terminal receipt of synchronization signals.

In one embodiment, the determined required terminal receipt of synchronization signals is associated with the transmission period and duration of the synchronization signals.

In one embodiment, the time advance duration includes a sum of a time period associated with the determined required terminal receipt of synchronization signals and a determined duration of the WUS.

In one embodiment, the time advance duration further includes a sum of a transition time associated with terminal time to change operational state.

In one embodiment, the method comprises transmitting system information for terminal reception, identifying said time advance duration.

BRIEF DESCRIPTION OF THE DRAWINGS

Various embodiments will be described with reference to the drawings, in which.

DETAILED DESCRIPTION

Figure 1A:
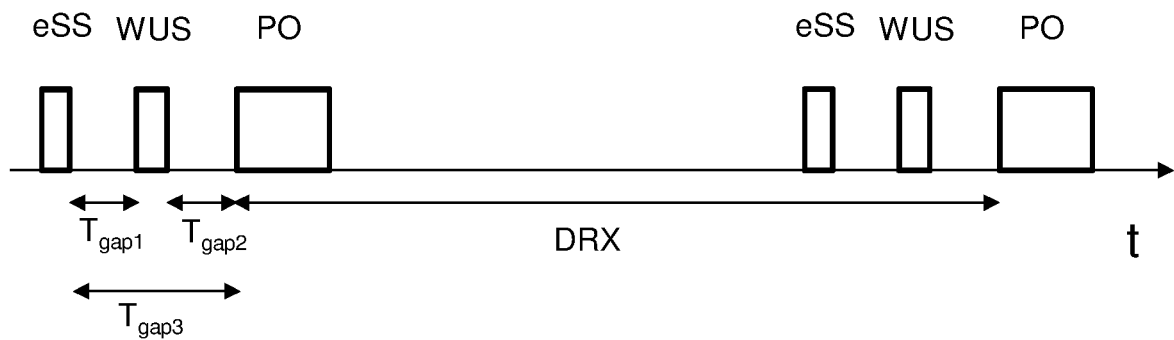
FIG. 1A illustrates synchronization signal transmission and occasions for paging and wake-up, according to a configuration where a main receiver is operated for both wake-up signal reception and paging signal reception.
Figure 1B:
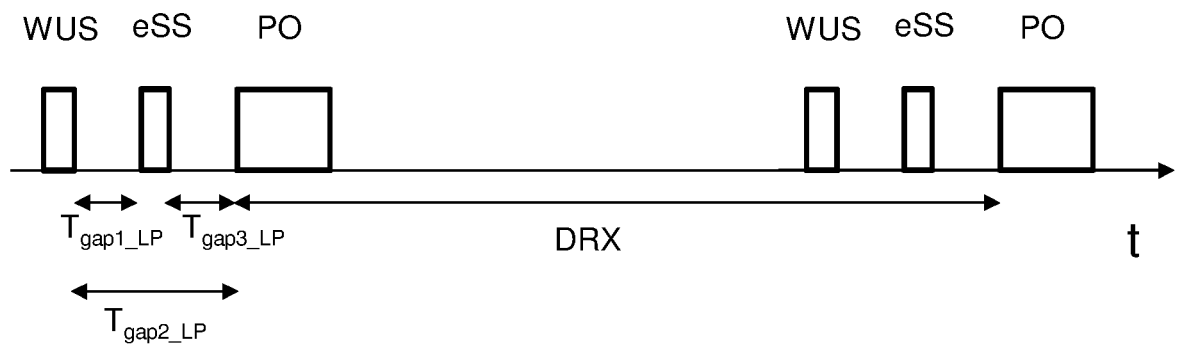
FIG. 1B illustrates synchronization signal transmission and occasions for paging and wake-up, according to a configuration where a separate receiver is operated for wake-up signal reception and a main receiver is operated for paging signal reception.
Figure 2:
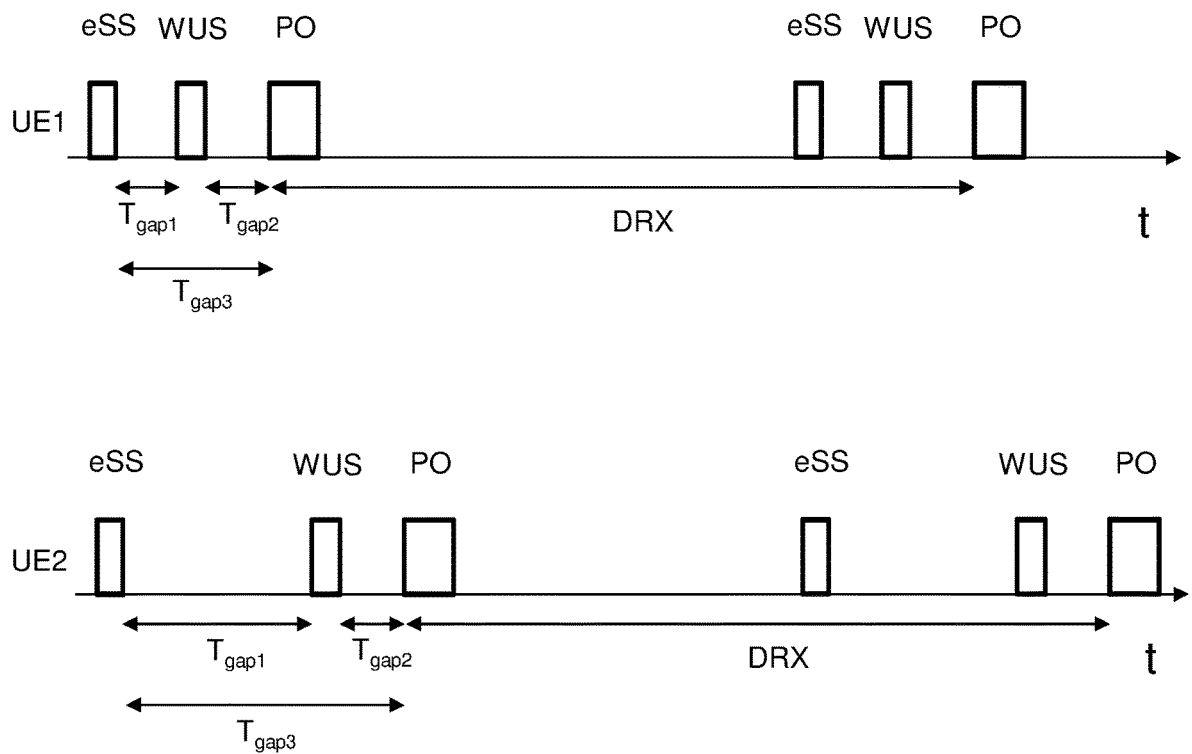
FIG. 2 illustrates synchronization signal transmission and occasions for paging and wake-up for two terminals sharing DRX cycle but with different paging occasions.

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Various embodiments are outlined herein, generally suitable for employment in a 3GPP radio communication system for machine type communication, but any type of wireless communication system operating with a wake-up signal usable for initiating paging may employ the suggested solutions. For this reason, the term terminal or UE will generally be used to denote a wireless device connectable by e.g. radio communication with an access network, and the term access node or base station will be used to denote a node of the access network configured to provide wireless access to terminals within a certain cell or coverage area.

In broad terms, solutions are provided for signaling a terminal in idle mode from an access node of a wireless network, wherein the terminal is configured to operate with discontinuous reception (DRX) and may react to a wake-up signal (WUS) from a network when paging is scheduled at a paging occasion (PO) of the DRX cycle. More specifically, the proposal is to add a new functionality into the 3GPP specifications to control the time relation between a synchronization signal, e.g. eSS, usable for detecting a WUS or a control channel in the paging occasion in the terminal, the WUS and the PO. This involves repeatedly transmitting the synchronization signal with a transmission period which is associated with the DRX period or cycle.

In various embodiments, the periodicity of the eSS is a function of PO cycles or DRX duration, e.g., eSS periodicity is multiples of PO cycles or in the other word a fraction of DRX duration. In various embodiments, the transmission period of the repeated synchronization signal is a fraction 1/k of the DRX period, where k is an integer number, e.g. k=1, 2, 3, ..., n. In other words, for every DRX period there are k eSS periods. In various embodiment it is proposed that a 3GPP specification may include an upper limit of the eSS periodicity, being a function of the cell specific DRX duration. In one embodiment, the transmission period of the synchronization signal eSS is equal to or shorter than the DRX period. In this manner the specifications will ensure that a UE will be able to find an eSS transmission at least within a given time period, e.g. paging cycle duration, prior to a PO.

Figure 3A:
FIG. 3A illustrates definition of a time advance period prior to a paging occasion, according to a configuration where a main receiver is operated for both wake-up signal reception and paging signal reception.
Figure 3B:
FIG. 3B illustrates definition of a time advance period prior to a paging occasion, according to a configuration where a separate receiver is operated for wake-up signal reception and a main receiver is operated for paging signal reception.

FIGS. 3A and 3B illustrate configuration of signaling according to various embodiments, wherein a time-advance duration is defined. The time advance defines a time duration before paging occasions when a terminal need to activate its reception so that the UE is fully prepared to receive and decode any potential paging message. We propose that parameters controlling this time advance duration $T_{adv}$ can be specified in 3GPP technical specifications. Specifically, the 3GPP specifications may include a limitation to describe that the UE can expect that the network configuration of eSS periodicity and WUS timing ensures a minimum time advance value $T_{adv}$.

In one embodiment, the time advance duration $T_{adv}$ is a function including a sum of at least maximum eSS length and a maximum WUS length. In one embodiment, $T_{adv}$ may be a function which also adds a transition time $T_{tr}$, where the transition time includes the time needed by the terminal to change from one operational state to another, i.e., Tgaps. In various embodiments, the time advance duration may be given by $$T_{adv} = \max \text{length}(T_{wus}) + \max \text{length}(T_{eSS}) + T_{tr}.$$

The maximum time duration, maxlength($T_{eSS}$), needed to detect eSS, may be a value dependent on determined required terminal receipt of synchronization signals, e.g. based on a certain scenario by the access node. This may be based on the specific target coverage area for the cell served by that access node, such as on a worst-case scenario. The maximum time duration, maxlength($T_{eSS}$) will then depend on at least the periodicity of the eSS, and preferably also on the duration of each eSS synchronization signal transmission. eSS is a signal that is periodically transmitted by the eNB. From implementation point of view, there should not be a restriction for the UE to use eSS as many as the UE wants. maxlength($T_{eSS}$) here refers to the maximum duration where the UE is expected to minimize its power consumption. In an embodiment where the eSS is repeated with a transmission period which is associated with the DRX period, such as an integer fraction of the DRX period, maxlength($T_{eSS}$) is also correlated with the DRX periodicity. The maximum time duration, max(Twus), is configured in SIB to the terminals, and may be set by the network or by specification. In case an eSS is not transmitted, e.g. if the cell is not configured with eSS transmission there may still be a required time to detect signal for synchronization, e.g. if the UE performs synchronization based on WUS and/or other downlink signals such as PSS/SSS, CRS. Hence, even without an eSS there is a need to determine time durations and limitations on the timing configuration between e.g WUS and paging indication (MPDCCH transmissions) in PO. This timing configuration is necessary to be informed to the UEs, for example, as part of the system information.

Depending on the two configuration Config. 1 and Config. 2, the transition time $T_{tr}$ can be different:

In Config. 1, $T_{tr}$ may include the sum ($T_{gap1} + T_{gap2}$) and where $T_{gap1}$ and $T_{gap2}$ are the min value needed for UE to change from one operational state to another.

In Config. 2, $T_{tr}$ may include the sum ($T_{gap1\_LP} + T_{gap3\_LP}$). The time-gap $T_{gap1\_LP}$ and $T_{gap3\_LP}$ may be set to the same value. The time-gap $T_{gap1\_LP}$, compared to $T_{gap1}$, needs to be set to a higher value as the UE needs to turn on a new radio, i.e. the main receiver.

Furthermore, $T_{tr}$ may represent a value considering not only the time to change the state of a wireless receiver(s) from "off" to "on", but also time required for fine frequency synch, channel estimation, Doppler estimation prior to the MPDCCH reception (paging indication in this context) etc. In one embodiment, $T_{tr}$ may be determined by the eNB, based on specified parameters, and on configuration (Config. 1 or 2). In another embodiment, $T_{tr}$ may be predetermined by 3GPP specification.

In order for the network to configure suitable time advance $T_{adv}$, the network would have a benefit of knowing the type of UE implementation, with regard to Config. 1 or 2, e.g. because different time gaps are required dependent on such configuration. This can be achieved e.g. if the UE indicates its capability to the network e.g. as a specific UE capability or via other RRC signaling. If the configuration of PO, WUS occasion and eSS transmission is not such that there is deemed to be sufficient time between the WUS occasion and subsequent eSS transmission, the network may signal the terminal that Config. 2 is not operational. Alternatively, the access node may update its configuration such that both Config. 1 and Config. 2 are operational in the cell.

Figure 4A:
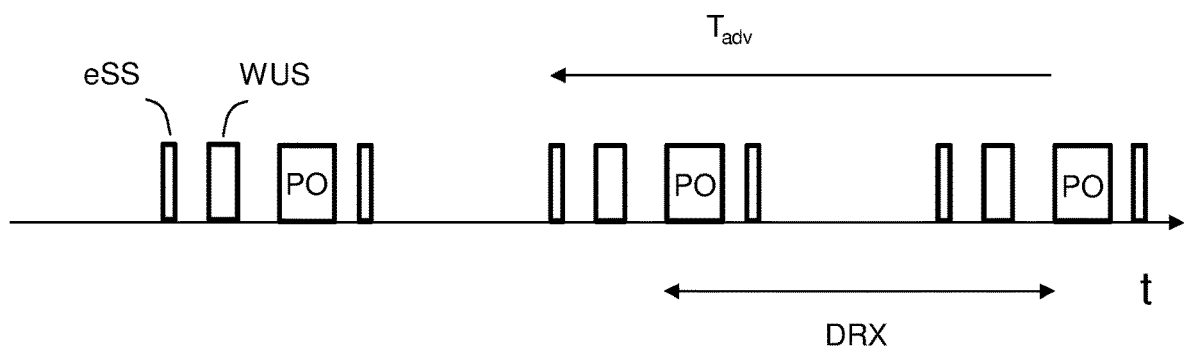
FIG. 4A illustrates a time advance period prior to a paging occasion where synchronization signal transmission is provided with half the period of the DRX period.
Figure 4B:
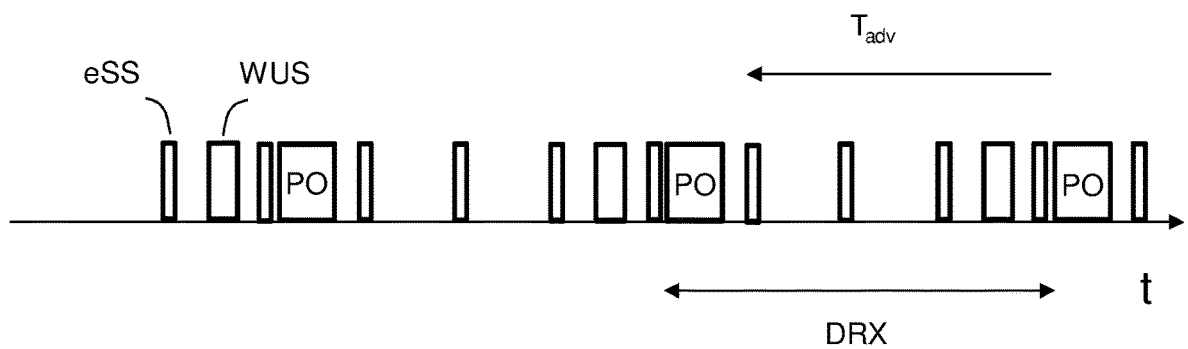
FIG. 4B illustrates a time advance period prior to a paging occasion where synchronization signal transmission is provided with one fourth of the period of the DRX period.

FIGS. 4A and 4B schematically illustrate operation in DRX idle mode for a terminal operating under Config. 1, with MPDCCH paging occasions PO determined by the access node for a terminal. The drawing indicates the time advance duration $T_{adv}$ and the DRX period. Furthermore, occasions of eSS transmission are indicated as the narrowest boxes, having a transmission period associated with the DRX period, whereas WUS occasions are shown in connection to each PO. Given the determined maxlength($T_{eSS}$), WUS duration and possibly additional transition time, the time advance duration includes 3 eSS transmissions, which are deemed required for proper eSS detection to be able to decode a WUS.

In the example of FIG. 4A, the eSS transmission period is associated with the DRX period to a factor 2, or fraction ½, i.e. the eSS period is ½ times the DRX period. Since the time advance $T_{adv}$ is larger than the DRX period, the terminal may still be required to activate its receiver to receive every eSS signal, in order to safely be able to decode a WUS, when received.

In the example of FIG. 4B, the eSS transmission period is associated with the DRX period to a factor 4, or fraction ¼, i.e. the eSS period is ¼ times the DRX period. Since only three eSS signals are deemed required and cover in the time period having the time advance duration $T_{adv}$, the terminal need not activate its receiver to receive the eSS signal occurring between the WUS and the PO, and still be in order to decode a WUS, when received. For even shorter eSS transmission periods, more of those transmissions may be disregarded by the terminal. At some point, the $T_{adv}$, will be limited by the duration of the WUS and $T_{tr}$, and further shortened eSS period will not be of any benefit to the power consumption of the terminal.

In order for a terminal receiving signals from an access node to properly set activation of its receiver(s) in accordance with the solutions proposed herein, the network may be configured to transmit system information for terminal reception, which system information identifies said time advance duration. The terminal may e.g. be configured in SIB. This system information may be provided in one of a variety of ways, of which some examples are provided herein. In one embodiment, $T_{adv}$ may be specifically provided, or a code identifying $T_{adv}$. $T_{adv}$ may be provided or identified as a duration, to be applied prior to a certain point in time, e.g. the start of or another point in time associated with a PO. Alternatively, $T_{adv}$ may be provided as a time slot or a point in time, from which the terminal may activate its receiver.

In other embodiments, maxlength($T_{eSS}$) may be specifically provided, or a code identifying this time duration. In yet another embodiment, the access node may provide an indication of a number of eSS signals to receive in order to detect eSS, and the eSS periodicity, e.g. the transmission period, may also be configured in SIB or otherwise informed, e.g. in RRC. Any combination of these examples is also possible. As noted, WUS duration is preferably also configured in SIB, and $T_{tr}$ may be predetermined by specification, and thus a preconfigured value in the terminal, or otherwise also configured in SIB. With this information, the terminal may be configured to determine $T_{adv}$ by calculation or by mapping in a table.

Figure 5:
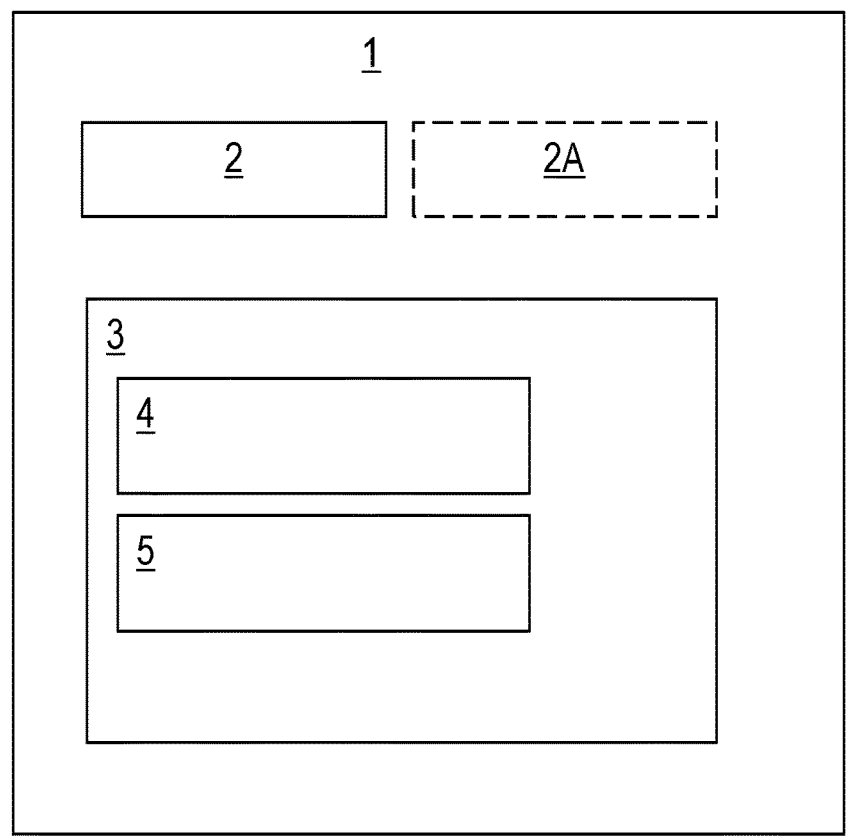
FIG. 5 schematically illustrates elements included in a terminal configured in accordance with various embodiments.

FIG. 5 schematically illustrates a terminal 1 for use in a radio communication system as presented herein. The terminal 1 may be configured as a machine to machine type device, such as a terminal operating under the specifications associated with eMTC or Nb-IoT of the 3GPP. Obviously, the terminal may include other features and elements than those shown in the drawing or described herein, such as at least one antenna, power supply, a casing etc.

The terminal 1 may be configured for communication with a access node 10 of e.g. a radio access network RAN, and comprise a transceiver 2, such as a radio receiver and transmitter for communicating with the network node 10 through at least an air interface. In various embodiments, the terminal 1 may include an additional receiver 2A, configured to operate as a low power receiver for WUS detection. The terminal 1 further comprises a control unit 3 including a data memory 4, such as a non-volatile memory, holding computer program code, and a processing device 5, such as a microprocessor. The processing device 5 is thereby configured to execute the computer program code from the memory 4, wherein the control unit 3 is configured to control the terminal 1 to carry out any of the method steps as provided herein.

In one embodiment, the terminal may be configured to operate in idle mode to detect signaling from an access node of a wireless network, comprising receiving configuration from the access node, identifying paging occasions and wake-up signal occasions associated with a discontinuous reception DRX period, receiving information from the access node, identifying a time advance duration; and activating a wireless signal receiver in the terminal for a period of said time advance duration prior to each paging occasion.

In various embodiments, the terminal may be configured to selectively activate said wireless signal receiver in the period of said time advance duration, and selectively inactivating said wireless receiver outside the period of said time advance duration, when no wake-up signal is detected.

In various embodiments, the terminal may be configured to selectively detect synchronization signals in the period of said time advance duration, and disregard synchronization signals outside the period of said time advance duration.

If a wake-up signal is detected in the period of said time advance duration, the terminal may be configured to detect a paging message in a paging occasion succeeding said time advance duration.

As noted, detection of a synchronization signals, wake-up signal and paging signal may be carried out by a main receiver in Config. 1, whereas at least the wake-up signal may be received by an auxiliary receiver in Config. 2.

The processing device 5 of the terminal 1 may include one or multiple processors, microprocessors, data processors, co-processors, and/or some other type of component that interprets and/or executes instructions and/or data. Processing device 5 may be implemented as hardware (e.g., a microprocessor, etc.) or a combination of hardware and software (e.g., a system-on-chip (SoC), an application-specific integrated circuit (ASIC), etc.). The processing device 5 may be configured to perform one or multiple operations based on an operating system and/or various applications or programs.

The data memory 4 may include one or multiple memories and/or one or multiple other types of storage mediums. For example, data memory 4 may include a random access memory (RAM), a dynamic random access memory (DRAM), a cache, a read only memory (ROM), a programmable read only memory (PROM), flash memory, and/or some other type of memory. Data memory 4 may include a hard disk (e.g., a magnetic disk, an optical disk, a magneto-optic disk, a solid state disk, etc.).

Software defined by said computer program code may include an application or a program that provides a function and/or a process. The software may include device firmware, an operating system (OS), or a variety of applications that may execute in the control unit 3.

Figure 6:
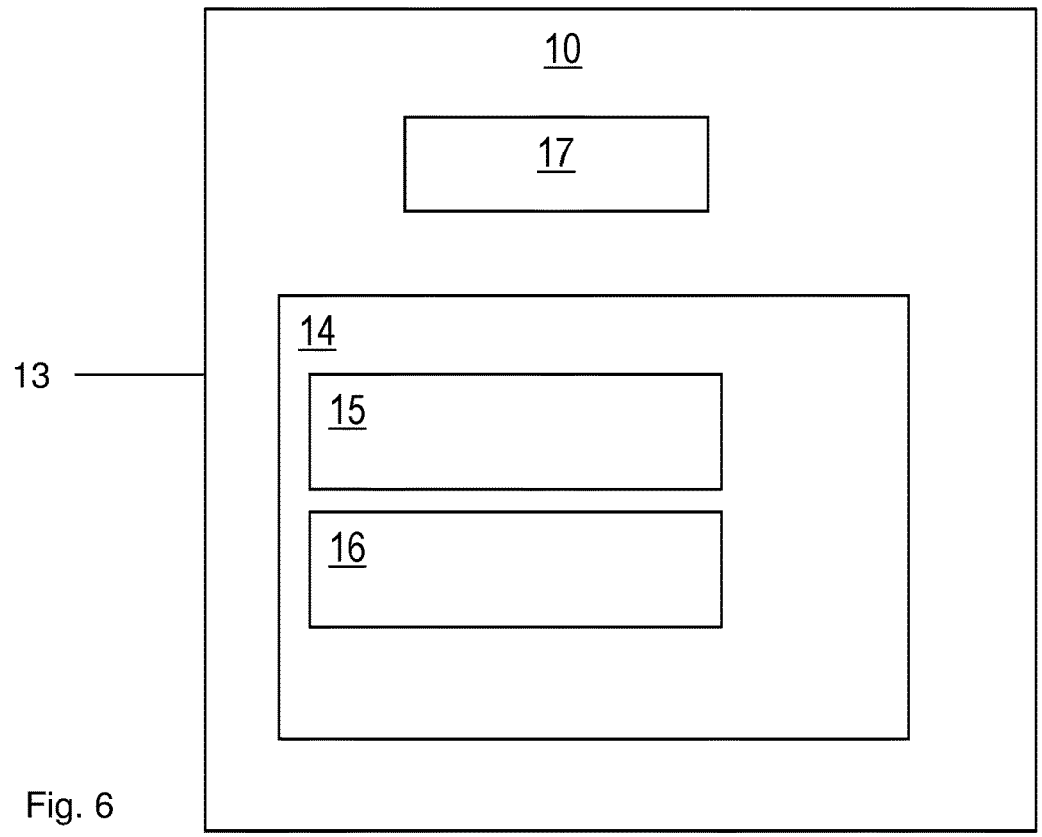
FIG. 6 schematically illustrates elements included in an access node a configured in accordance with various embodiments.

FIG. 6 schematically illustrates an access node 10 of a wireless network, such as a radio network under 3GPP, for use in a radio communication system as presented herein. The access node 10 thus forms part of a radio access network RAN, preferably having an interface 13 to a core network. The access node 10 comprises at least a wireless interface 17 for terminal communication by e.g. radio. The access node further includes a control unit 14 including a data memory 15, such as a non-volatile memory, holding computer program code, and a processing device 16, e.g. one or more microprocessors, configured to execute the computer program code. The control unit 14 is thereby configured to control the network node 10 to carry out any of the steps outlined herein. Specifically, the access node may be configured to determine a DRX periodicity and paging occasions in accordance with that DRX periodicity for terminals in its coverage area. The access node 10 may further be configured to determine WUS occasions associated with said paging occasions, and to transmit a synchronization signal eSS usable for detecting the WUS or a control channel in the paging occasion in the terminal, wherein the synchronization signal is repeatedly transmitted with a transmission period which is associated with said DRX period.

The processing device 16 and the data memory 15 may e.g. be configured in accordance with the features outlined for the processing device 5 and data memory 4, respectively.

Various embodiments have been disclosed herein by way of example, to illustrate various ways of realizing methods and devices falling within the terms of the claims. The suggested solutions thus provide a method to control timing relations for sync signal transmissions, such as eSS, and paging transmissions, with a time period between eSS transmissions being a function of the DRX interval or period. This way, a mapping of supported eSS periodicity and DRX interval is introduced. Furthermore, a time duration window $T_{adv}$ is provided, allowed for the time-gaps created between eSS, WUS and MPDCCH paging transmissions respectively. Unless where specifically noted, the described embodiments, or features related to those embodiments, may be combined.

The invention claimed is:

1. A method for operating a terminal in idle mode to detect signaling from an access node of a wireless network, comprising
receiving configuration from the access node, identifying paging occasions and wake-up signal, WUS, occasions associated with a discontinuous reception DRX period,
receiving information from the access node, identifying a time advance duration, which is dependent on a transmission period of a synchronization signal, which is associated with the DRX period, wherein the transmission period is a fraction 1/k of the DRX period, where k is an integer number;
activating a wireless signal receiver in the terminal for a period of said time advance duration prior to each paging occasion; and
detecting the synchronization signal in the period of said time advance duration.

2. The method of claim 1, wherein the synchronization signal is usable for detecting a WUS or a control channel in the paging occasion in the terminal.

3. The method of claim 2, comprising:
transmitting terminal capability to the wireless network, indicating whether the terminal includes a separate receiver for WUS detection.

4. The method of claim 1, comprising
detecting a WUS in the period of said time advance duration;
detecting a paging message in a paging occasion succeeding said time advance duration.

5. The method of claim 4, comprising:
transmitting terminal capability to the wireless network, indicating whether the terminal includes a separate receiver for WUS detection.

6. The method of claim 1, comprising:
transmitting terminal capability to the wireless network, indicating whether the terminal includes a separate receiver for WUS detection.

7. A method for signaling a terminal in idle mode from an access node of a wireless network, comprising:
transmitting configuration to the terminal, identifying repeated paging occasions for the terminal with a discontinuous reception, DRX, period, and wake-up signal, WUS, occasions associated with said paging occasions;
transmitting system information for terminal reception, identifying a time advance duration, which is dependent on a transmission period of a synchronization signal, which is associated with the DRX period, wherein the transmission period is a fraction 1/k of the DRX period, where k is an integer number; and
transmitting the synchronization signal, which is usable for assisting in detecting the WUS or a control channel in the paging occasion in the terminal, wherein the synchronization signal is repeatedly transmitted with the transmission period which is associated with said DRX period.

8. The method of claim 7, wherein the transmission period of the synchronization signal is smaller than the DRX period.

9. The method of claim 8, wherein the time advance duration is dependent on a determined required terminal receipt of synchronization signals.

10. The method of claim 7, wherein the time advance duration is dependent on a determined required terminal receipt of synchronization signals.

11. The method of claim 10, wherein the determined required terminal receipt of synchronization signals is further associated with a duration of the synchronization signals.

12. The method of claim 11, wherein the time advance duration includes a sum of a time period associated with the determined required terminal receipt of synchronization signals and a determined duration of the WUS.

13. The method of claim 10, wherein the time advance duration includes a sum of a time period associated with the determined required terminal receipt of synchronization signals and a determined duration of the WUS.

14. The method of claim 13, wherein the time advance duration further includes a sum of a transition time associated with terminal time to change operational state.

15. The method of claim 7, wherein the time advance duration is dependent on a determined required terminal receipt of synchronization signals.

16. A method for signaling a terminal in idle mode from an access node of a wireless network, comprising:
determining repeated paging occasions for the terminal with a discontinuous reception, DRX, period;
determining wake-up signal, WUS, occasions associated with said paging occasions;
transmitting a synchronization signal usable for assisting in detecting the WUS or a control channel in the paging occasion in the terminal, wherein the synchronization signal is repeatedly transmitted with a transmission period which is associated with said DRX period, the transmission period being a fraction 1/k of the DRX period, where k is an integer number.

* * * * *